US009766676B2

(12) United States Patent
Thevar et al.

(10) Patent No.: US 9,766,676 B2
(45) Date of Patent: Sep. 19, 2017

(54) COMPUTING SUBSYSTEM HARDWARE RECOVERY VIA AUTOMATED SELECTIVE POWER CYCLING

(71) Applicant: INTEL CORPORATION, Santa Clara, CA (US)

(72) Inventors: Balakesan P. Thevar, Bangalore (IN); Aashish S. Pangam, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 469 days.

(21) Appl. No.: 14/129,538

(22) PCT Filed: Dec. 28, 2012

(86) PCT No.: PCT/US2012/072085
§ 371 (c)(1),
(2) Date: Dec. 26, 2013

(87) PCT Pub. No.: WO2014/065841
PCT Pub. Date: May 1, 2014

(65) Prior Publication Data
US 2015/0220126 A1    Aug. 6, 2015

(30) Foreign Application Priority Data

Oct. 26, 2012   (IN) .......................... 4471/CHE/2012

(51) Int. Cl.
*G06F 1/28* (2006.01)
*G06F 1/24* (2006.01)
(Continued)

(52) U.S. Cl.
CPC .................. *G06F 1/28* (2013.01); *G06F 1/24* (2013.01); *G06F 1/266* (2013.01); *G06F 11/0706* (2013.01); *G06F 11/0793* (2013.01)

(58) Field of Classification Search
None
See application file for complete search history.

(56) References Cited

U.S. PATENT DOCUMENTS

| 5,398,265 A * | 3/1995 | Gabaldon ................. G06F 1/24 |
| | | 710/10 |
| 6,625,740 B1 * | 9/2003 | Datar .................. G06F 9/30181 |
| | | 713/300 |

(Continued)

FOREIGN PATENT DOCUMENTS

| JP | 1992153810 | 5/1992 |
| JP | 2001184138 | 7/2001 |

(Continued)

OTHER PUBLICATIONS

International Search Report and Written Opinion, Mailed Date: Jul. 26, 2013, Application No. PCT/US2012/072085 Filed Date: Dec. 28, 2012, pp. 16.

(Continued)

Primary Examiner — Kim Huynh
Assistant Examiner — Paul J Yen

(57) ABSTRACT

Various embodiments are generally directed to automated selective power cycling of an inoperative hardware-based subsystem of a computing device, while not power cycling other components of the computing device, in response to detection of that subsystem becoming inoperative. An apparatus comprising a controller processor circuit; a first component comprising digital logic and provided with electric power controlled by the controller processor circuit; a second component comprising digital logic and provided with electric power controlled by the controller processor circuit; and a controller storage communicatively coupled to the controller processor circuit and arranged to store instructions operative on the controller processor circuit to receive a signal that indicates that the first component is inoperative, (Continued)

and cycle the electric power to the first component while continuing to provide electric power to the second component based on the signal. Other embodiments are described and claimed herein.

20 Claims, 10 Drawing Sheets

(51) Int. Cl.
*G06F 11/07* (2006.01)
*G06F 1/26* (2006.01)

(56) References Cited

U.S. PATENT DOCUMENTS

| | | | |
|---|---|---|---|
| 7,279,810 | B2 | 10/2007 | Nitta |
| 7,350,087 | B2 | 3/2008 | Naveh et al. |
| 7,571,353 | B2 | 8/2009 | Largman et al. |
| 7,774,633 | B1* | 8/2010 | Harrenstien ............ G06F 1/24 713/300 |
| 7,962,735 | B2 | 6/2011 | Huang et al. |
| 8,726,047 | B2 | 5/2014 | Lee et al. |
| 2006/0277424 | A1* | 12/2006 | Ryan ................. G06F 1/3203 713/300 |
| 2007/0006294 | A1* | 1/2007 | Hunter ................ G06F 21/606 726/14 |
| 2010/0194196 | A1* | 8/2010 | Jouper ................. H02J 1/14 307/31 |
| 2011/0185215 | A1* | 7/2011 | Neben ................ G06F 1/12 713/401 |

FOREIGN PATENT DOCUMENTS

| | | |
|---|---|---|
| JP | 2001202162 | 7/2001 |
| JP | 2001257694 | 9/2001 |
| JP | 2004266661 A | 9/2004 |

OTHER PUBLICATIONS

Cinque, M., et al., "How do Mobile Phones Fail? A Failure Data Analysis of Symbian OS Smart Phones," 2007 37th Annual IEEE/IFIP International COnference on Dependable Systems and Networks (DSN'07), pp. 585-594 (2007).

Kanno, Y., et al., "Hierarchical Power Distribution with 20 Power Domains in 90-NM Low-Power Multi-CPU Processor," 2006 IEEE International Solid-State Circuits Conference, pp. 2200-2209 (2006).

Office Action received for Japanese Patent Application No. 2015-534457, mailed May 10, 2016, 10 pages including 5 pages English translation.

Office Action received for Japanese Patent Application No. 2015-534457, mailed Nov. 28, 2016, 8 pages including 4 pages English translation.

* cited by examiner

COMPUTING SUBSYSTEM HARDWARE RECOVERY VIA AUTOMATED SELECTIVE POWER CYCLING

BACKGROUND

Most computing devices are made up of various hardware-based subsystems that each incorporate complex digital logic cooperating with complex support software. As the range of capabilities of computing devices has continued to increase, so has the complexity of the digital logic of many of these subsystems. Incorporating state machines and/or processing components that execute independent sequences of instructions into many of these subsystems has become commonplace, resulting in increases in instances of those subsystems entering into an inoperative state in which they are rendered incapable of continuing to perform their functions.

Such an inoperative state can arise where unexpected, inconsistent and/or ill-timed inputs are provided to such complex digital logic. An undefined state may be entered into from which neither the digital logic itself or whatever sequence of instructions that it executes is able to return. Such situations are often referred to as a "lock up" or "hang." In such a state, such digital logic may become unresponsive to new inputs intended to cause a "reset" of that digital logic to a known initial state from which the digital logic may then be caused to return to normal functionality.

For a user of a computing device in which such an event occurs involving one of its subsystems (e.g., a subsystem for graphical display, audio output, network communications, data storage, user input, etc.), such an event and the accompanying inability to make use of software or another mechanism to act solely on that portion to regain normal functionality (even where users are able to recognize what has happened) provides a frustrating user experience. In such cases, users are often confronted with the stark choice of either attempting to make further use of that computing device without the benefit of the normal functionality of that subsystem, or acting to reset the entirety of that computing device, the latter choice often proving to be time consuming and/or entailing the loss of data.

DETAILED DESCRIPTION

Figure 1:
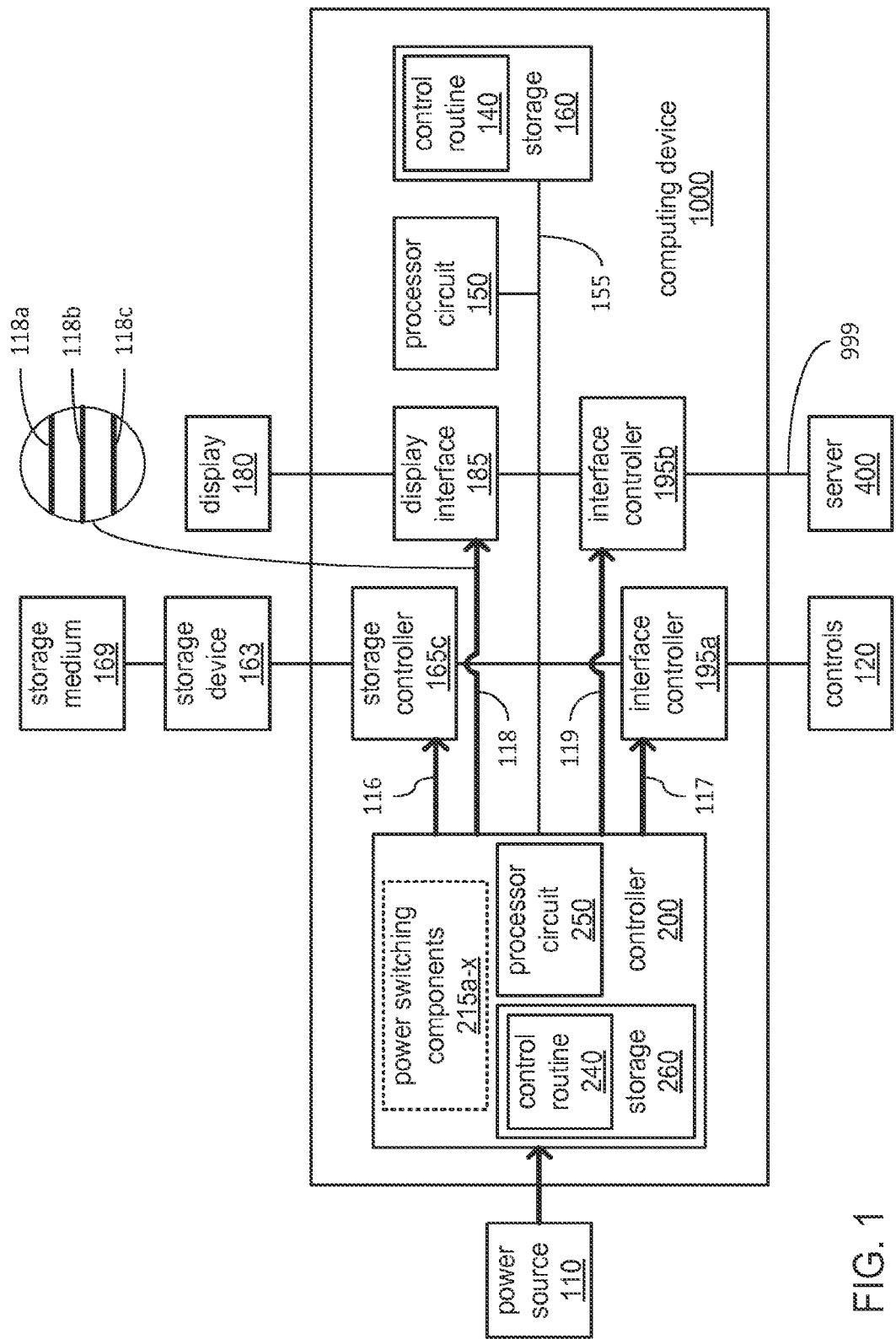
FIG. 1 illustrates a first embodiment of booting a computing device.

Various embodiments are generally directed to automated selective power cycling of an inoperative hardware-based subsystem of a computing device, while not power cycling other components of the computing device, in response to detection of that subsystem becoming inoperative. More specifically, a controller of a computing device detects that the subsystem of the computing device has entered an inoperative state, and selectively removes and then re-applies electric power to one or more power conductors conveying electric power to that subsystem in response to detection of that inoperative state.

The controller may perform such detection and/or such power cycling with various possible degrees of independence from a processor circuit of that computing device. The controller may cooperate in various ways with a device driver that is associated with that subsystem and that is executed by that processor circuit to detect that inoperative state and/or to cause that subsystem to return to normal functionality following power cycling to place it in a known initial state.

Such cooperation may be effected through one or more registers of that subsystem that are accessible to one or both of the controller and the processor circuit executing the device driver associated with that subsystem. Alternatively or additionally, such cooperation may be effected through communications between the device driver associated with that subsystem and a device driver that is associated with the controller and that is also executed by the processor circuit.

Following the power cycling of that subsystem, the controller may further cooperate with the device driver associated with that subsystem to signal an operating system executed by the processor circuit to aid in returning that subsystem to normal functionality following power cycling to place that subsystem in a known initial state.

In one embodiment, for example, an apparatus comprising a controller processor circuit, a first component comprising digital logic and provided with electric power controlled by the controller processor circuit, a second component comprising digital logic and provided with electric power controlled by the controller processor circuit, and a controller storage communicatively coupled to the controller processor circuit and arranged to store instructions. The instructions are operative on the controller processor circuit to receive a signal that indicates that the first component is inoperative and cycle the electric power to the first component while continuing to provide electric power to the second component based on the signal.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 optionally coupled to a server 400. Each of the computing devices 400 and 1000 may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc. As depicted, the computing devices 400 and 1000 exchange signals conveying any of a variety of types of data. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 comprises one or more of a processor circuit 150 (in the role of a main processor circuit of the computing device 1000), a storage 160 storing a control routine 140, a power source 110, a storage controller 165c, a display interface 185, and interface controllers 195a-b. As depicted, the storage controller 165c, the display interface 185 and the interface controller 195a are depicted as coupled to a storage device 163 providing access to the contents of a storage medium 169, a display 180 and controls 120, respectively. The computing device 1000 may additionally comprise one or more of the storage device 163, the display 180 and the controls 120. The interface controller 195b couples the computing device 1000 to the network 999, and therethrough to other computing devices such as the server 400.

As depicted, the computing device 1000 may also comprise a controller 200. The controller 200 comprises one or more of a processor circuit 250 (in the role of a controller processor circuit) and a storage 260 storing a control routine 240. The controller 200, with the processor circuit 250 executing at least the control routine 240 defines an operating environment of the controller 200 that is intentionally isolated from a main operating environment defined within much of the rest of the computing device 1000 by at least the processor circuit 150 executing the control routine 140. More specifically, the processor circuit 150 may be provided with limited or no access to the storage 260 and/or other components of the controller 200, thereby preventing unauthorized access to at least the control routine 240 (either as stored in the storage 260 or as executed by the processor circuit 250) by the processor 150. In contrast, the processor circuit 250 may have far greater access to hardware and/or software components of the rest of the computing device 1000 beyond the controller 200. As will be explained in greater detail, this enables the operating environment of the controller 200 to be employed in recurringly checking on the state of various other components of the computing device 1000 to detect components that are in an inoperative state.

It should be noted that although the controller 200 is depicted and discussed herein as incorporating a processor circuit executing a control routine to cause the controller 200 to perform the various functions described herein, this is but one example of the manner in which the controller 200 may be implemented. Other embodiments are possible in which the controller 200 is implemented substantially or entirely in hardware-based digital logic in which no instructions of any form of routine are executed. In such implementations, one or more discrete logic components and/or programmable logic devices may be used. Stated differently, the controller 200 comprises logic, implemented in any of a variety of ways, that causes the controller to perform the various functions described herein.

As also depicted, the computing device 1000 further comprises a coupling 155 that couples one or both of the processor circuit 150 and the controller 200 to one or more of the storage 160, the storage controller 165c, the display interface 185, and the interface controllers 195a-b. The coupling 155 is comprised of one or more buses, point-to-point interconnects, transceivers, buffers, crosspoint switches, and/or other electrical/optical conductors and/or logic. With the processor circuit 150 and the controller 200 being so coupled by the coupling 155, each is able to perform the various ones of the tasks to be described at length.

As further depicted, the power source 110 is coupled to the controller 200, and in turn, the controller 200 is further coupled to one or more of the storage controller 165c, the display interface 185, the interface controller 195a and the interface controller 195 via one or more power conductors 116, 117, 118 and 119, respectively. Through the power conductors 116-119, the controller 200 selectively provides or ceases to provide electric power to each of the storage controller 165c, the display interface 185, and the interface controllers 195a-b, as will be explained. In so doing, the controller 200 may incorporate any of a variety of types of power transistors or silicon switches to selectively provide power to each of the power conductors 116-119 (e.g., a plurality of power switching components of whatever quantity, specifically power switching components 215a through 215x depicted in FIG. 1).

In some embodiments, the computing device 1000 may be at least partially implemented as a SOC (system on-a-chip) in which at least some of the processor 150, the storage 160, the storage controller 165c, the display interface 185, the interface controllers 195a-b and the controller 200 may be combined within a single IC (integrated circuit). In such embodiments, one or more of the power conductors 116-119 may be formed as conductive traces traversing portions of a single common silicon die on which at least some of the components 165c, 185 and 195a-b are disposed. Alternatively, these components may be spread across more than one silicon die incorporated into a MCM (multi-chip module), in which case a subset of the power conductors 116-119 may extend between the separate silicon die within a MCM package at least partially as gold wires or other forms of electrical/optical conductors. As yet another alternative, these components may be spread across more than one silicon die disposed within separate chip packages (pin grid array, ball grid array, land grid array, dual in-line package, etc.), in which case a subset of the power conductors 116-119 may extend between die at least partially as traces formed on one or more circuitboards on which each of those chip packages are disposed.

In some embodiments, one or more of the power conductors 116-119 may comprise multiple conductors, each conveying electric power to a different portion of a single one of the components 165c, 185 and 195a-b. By way of example, and as depicted in FIG. 1, the display interface 185 may be provided with electric power, not through a single conductor 118, but through multiple conductors 118a, 118b and 118c. As will be familiar to those skilled in the art, different portions of digital circuitry within a single IC may require electric power provided at different voltages. By way of example, input/output drivers of an IC may require electric power at a higher voltage than processing circuitry more at the core of that IC. By way of another example, a single IC may be coupled to two different buses, each of which operate at very different voltage levels. By way of still another example, a portion of the digital logic of an IC may comprise DRAM cells requiring a different voltage than latches incorporated into digital logic employed in processing functions to retain data. To prevent malfunctions and/or damage to such ICs, the cycling of power may be required to be carried out in a manner in which the provision of power in each of multiple conductors conveying power to a single IC is discontinued in a particular order and then resumed in a particular order. By way of example, it may be that the provision of power to input/output drivers of an IC must be discontinued before the provision of power to core digital logic of that IC can be discontinued, and then restoring electric power must begin with providing electric power to that core digital logic before it can be provided to the input/output drivers. Where the controller 200 incorporates power switching devices 215a-x, one each of these power switching devices 215a-x may control the provision of electric power via a corresponding one of the conductors 118a-c.

In executing at least the control routine 140, the processor circuit 150 is caused to access and operate one or more of the storage controller 165c, the display interface 185 and the interface controllers 195a-b to perform various functions as directed by input received from a user of the computing device 1000 who uses the computing device 1000 to perform any of a variety of possible functions. However, on occasion, one or more of these components 165c, 185 or 195a-b may become inoperative due to receiving conflicting inputs, an unexpected logical impasse having arisen, etc., such that it is no longer able to perform its function.

In executing at least the control routine 240, the processor circuit 250 is caused to recurringly monitor each of the storage controller 165c, the display interface 185 and the interface controllers 195a-b to detect instances of one of these components becoming inoperative. In response, the processor circuit 250 is caused to cycle the electric power provided from the power source 110 by the controller 200 on an associated one of the power conductors 116-119 (e.g., momentarily ceasing provision of electric power, and then resuming provision of electric power) to that one of these components while maintaining the provision of electric power to the others of these components. Each of the components 165c, 185 and 195a-b incorporates logic to initialize themselves to known initial states upon being "turned on" or "powered up" (e.g., upon being provided with electric power). Thus, cycling the provision of electric power on the associated one of the power conductors 116-119 causes the one of these components detected as having become inoperative to be placed in a known initial state. Subsequently, a device driver associated with that one of these components is signaled to cause the processor circuit 150 to fully return that one of these components to use in performing whatever functions are directed by the user of the computing device 1000.

In some embodiments, the power source 110 may be of a type that stores a limited amount of electric power, e.g., a battery, fuel cell, supercapacitor, etc., as in embodiments in which the computing device 1000 is some form of portable computing device. In such embodiments, the controller 200 may function as a power controller that selectively places the computing device 1000 in one or more power saving modes in which electric power may cease to be provided via one or more of the power conductors 116-119 to one or more of the components 165c, 185 and 195a-b. As will be familiar to those skilled in the art of such power saving techniques, the processor circuit 250 may be caused by the control routine 140 to select which ones of these components are or are not to be provided with electric power based on any of a variety of algorithms that may take into account functionality of the computing device 1000 is being employed by its user at any given time (possibly as signaled to the controller 200 by the processor circuit 150). Thus, the controller 200 may serve in the dual roles of both power savings and recovery of hardware components that have become inoperative.

In various embodiments, each of the processor circuits 150 and 250 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160 and 260, as well as the combination of the storage device 163 and the storage medium 169, may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface controllers 195a-b, as well as the storage controller 165c, may employ any of a wide variety of signaling technologies enabling the computing device 1000 to be coupled through the network 999 and/or various hardware devices as has been described. Each of these interfaces comprises circuitry providing at least some of the requisite functionality to enable such coupling. However, these interfaces may also be at least partially implemented with sequences of instructions executed by the processor circuits 150 and/or 250 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various embodiments, the controls 120 (accessible via the interface controller 195a) may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. These controls may comprise manually-operable controls disposed upon a casing of the computing device 1000, and/or may comprise manually-operable controls disposed on a separate casing of a physically separate component of the computing device 1000 (e.g., a remote control coupled to other components via infrared signaling). Alternatively or additionally, these controls may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, the display 180 (accessible via the display interface 185) may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 2:
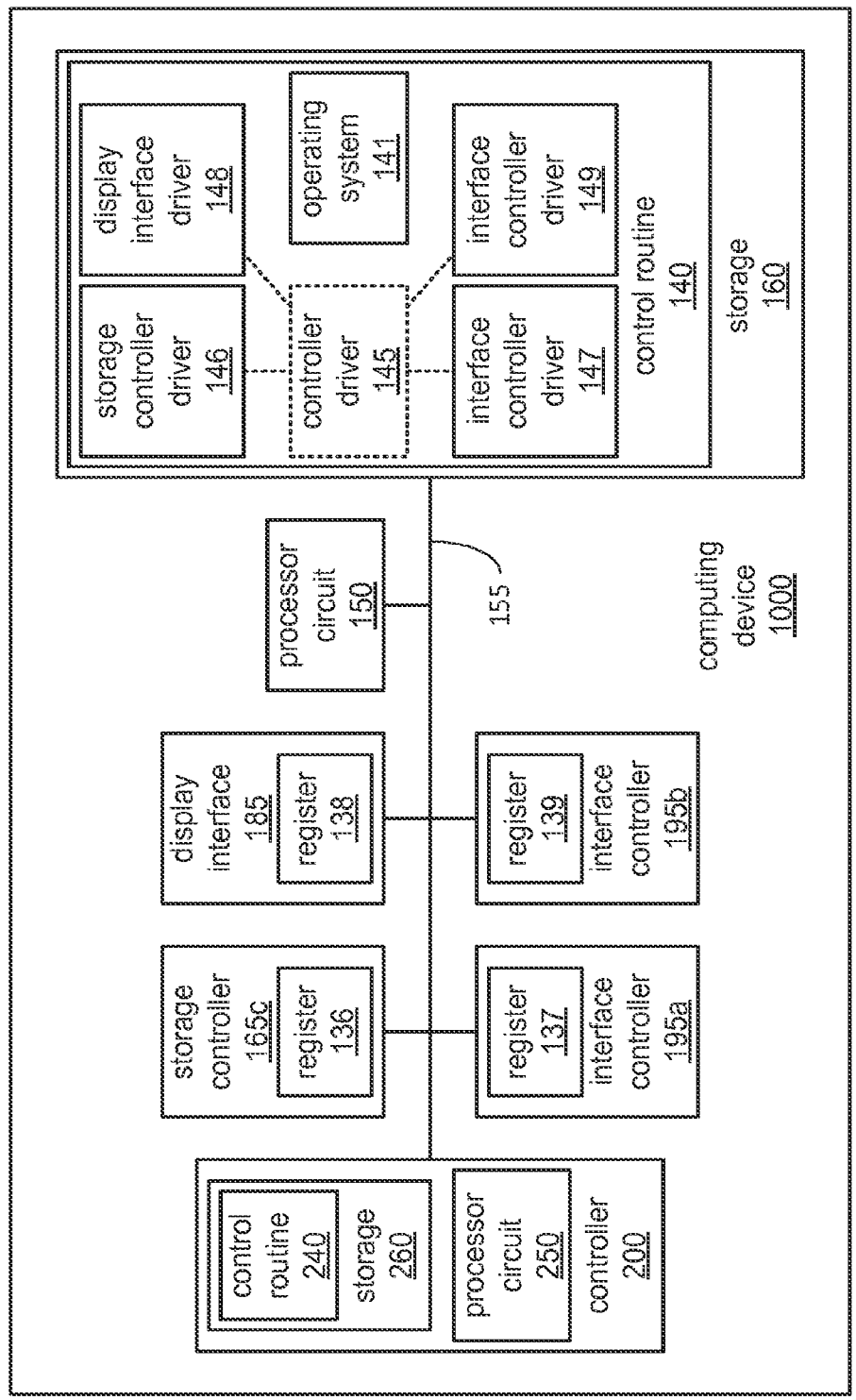
FIGS. 2-4 each illustrate a portion of the embodiment of FIG. 1, depicting various possible details of implementation.
Figure 3:
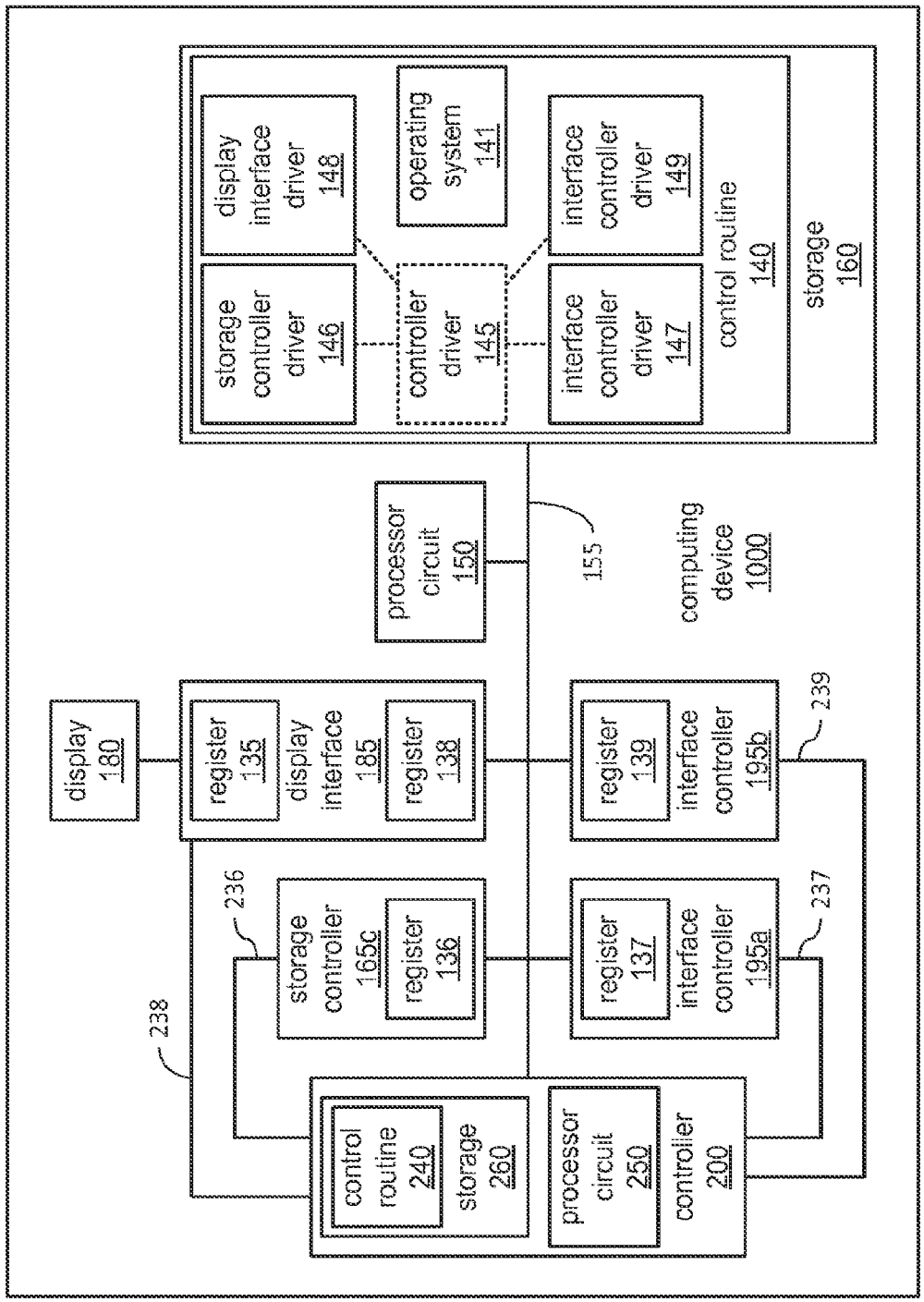
Figure 4:
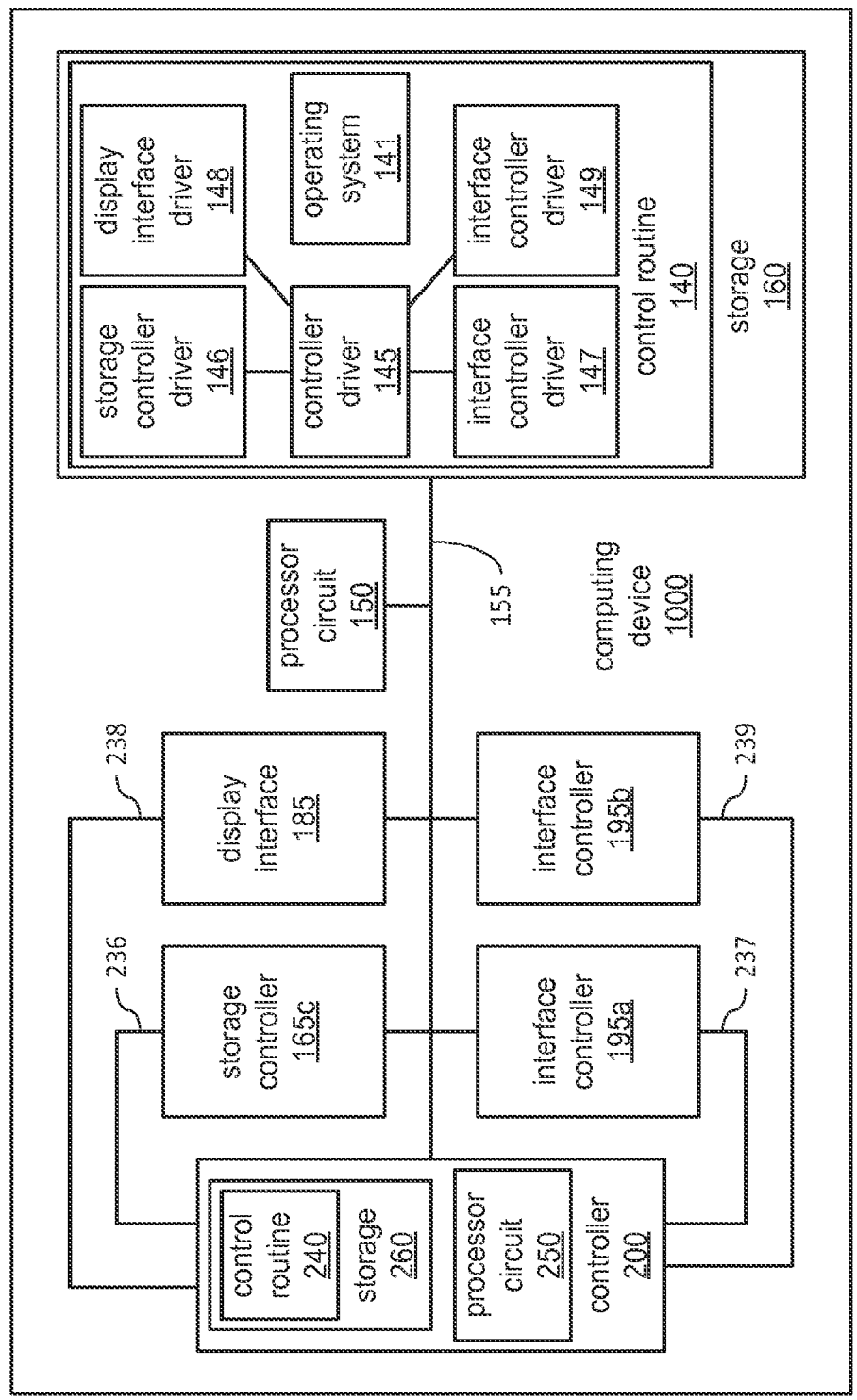

FIGS. 2, 3 and 4 each depict the same portion of the computing device 1000 in greater detail, but as different variants of embodiments in which detection of an inoperative state and coordination between the controller 200 and device drivers associated with components occurs somewhat differently. For sake of clarity of discussion, depictions of the power source 110 and the power conductors 116-119 have been omitted in FIGS. 2-5, along with depictions the controls 120, the storage device 163, the storage medium 169, the display 180 and the server 400.

In various embodiments, the control routine 140 comprises one or more of an operating system 141, a controller driver 145, a storage controller driver 146, an interface controller driver 147, a display interface driver 148, and a interface controller driver 149. The operating system 141 may be any of a variety of available operating systems appropriate for execution by the processor circuit 150, including without limitation, Windows™, OS X™, Linux®, iOS, or Android OS™.

The storage controller driver 146, the interface controller driver 147, the display interface driver 148, and the interface controller driver 149 are associated with the storage controller 165c, the interface controller 195a, the display interface 185 and the interface controller 195b, respectively. Each of these device drivers 146-149 provides support for the processor circuit 150 (in executing the operating system 141) to interact with and operate various aspects of the associated ones of these devices.

The controller driver 145 (if present) is associated with the controller 200, and may provide support for the processor circuit 150 (in executing the operating system 141) to interact with the controller 200 to place the computing device 1000 in one of one or more power saving modes. Also, where the controller driver 145 is present, the controller driver 145 may provide support for cooperation between the controller 200 and one or more of the device drivers 146-149, as will be explained in greater detail.

In various embodiments, each of the storage controller 165c, the interface controller 195a, the display interface 185, and the interface controller 195b comprise a register 136-139, respectively. As will be explained in greater detail, each of the registers 136-139 comprises one or more bits that are accessible on a recurring basis to determine whether their associated ones of the devices into which they are incorporated has become inoperative and/or has been returned to an initial known state as a result of power cycling by the controller 200.

In support of being accessed to detect an inoperative state, one or more of the registers 136-139 may comprise a bit that is changed between 0 and 1 values on a regular basis by its associated one of the devices 165c, 195a, 185 or 195b. Thus, while its associated one of these devices operates normally, this bit may be so changed at a regular and predictable interval, and an instance of that bit not having changed when expected may be an indication of that associated one of these devices having become inoperative. Alternatively, one or more of the registers 136-139 may comprise a bit that is initially set to 0 or 1 by its associated one of these devices until read, at which point the act of reading changes its setting to the other of 0 or 1, with that change remaining until set back to the original value it held before it was read. Thus, while the associated one of these devices operates normally, this bit should be changed back to that initial value within a selected amount of time since it was read. In yet another alternative, one or more of the registers 136-139 may comprise a multitude of bits representing a counter value that is incremented by the associated one of these devices at a regular interval as long as that associated one of these devices remains operable. Thus, an inoperative state may be detectable by a reading of that register revealing a counter value that is not what is expected.

Turning specifically to FIG. 2, in some embodiments, the processor circuit 150 is caused by execution of each of the device drivers 146-149 to recurringly read corresponding ones of each of the registers 136-139 through the coupling 155 to monitor corresponding ones of the devices 165c, 185 and 195a-b for indications of having entered an inoperative state. Upon detecting via one of the registers 136-139 that a corresponding one of these devices has become inoperative, the processor circuit 150 may initially be caused to attempt to correct the inoperative state, possibly through accessing a register or other portion of the inoperative device to reset it. Alternatively or additionally (possibly in response to an unsuccessful attempt at a reset), the processor circuit 150 may be caused to signal the controller 200 through the controller driver 145 to cycle the electric power provided to the inoperative device (while also providing an indication to the controller 200 of the identity of the inoperative device to subject to power cycling). In response, the controller 200 cycles the electric power it provides to the inoperative device via a corresponding one of the power conductors 116-119 (viewable in FIG. 1), by initially ceasing to provide electric power on that power conductor, and then resuming providing it. While doing so, the controller 200 maintains the provision of electric power to the others of these devices without interruption. Following this cycling of power, the controller 200 may signal the associated one of the device drivers 146-149 through the controller driver 145 to indicate that the electric power for that device has been cycled. Alternatively, following this cycling of power, the processor circuit 150 may be caused to detect, via its continued recurrent reading of the corresponding one of the register 136-139, that the device is no longer in an inoperative state and/or has had its electric power cycled such that it has been returned to a known initial state. In response, the processor circuit 150 is further caused to configure that device to once again be put to use.

Continuing with FIG. 2, alternatively, in some embodiments, the processor circuit 250 of the controller 200 is caused by execution of the control routine 240 to recurringly read each of the registers 136-139 through the coupling 155 to monitor corresponding ones of the devices 165c, 185 and 195a-b for indications of having entered an inoperative state. In so doing, the processor circuit 250 is caused to recurringly assume the role of bus master on at least a portion of the coupling 155, thereby displacing the processor circuit 150 as the bus master on at least that portion. Upon detecting via one of the registers 136-139 that a corresponding one of these devices has become inoperative, the processor circuit 250 may be caused, initially, to signal a corresponding one of the device drivers 146-149 to enable that corresponding one of the device drivers 146-149 to cause the processor circuit 150 to attempt to correct the inoperative state, possibly through causing the processor circuit 150 to access a portion of the inoperative device associated with initiating a reset of that inoperative device. Alternatively or additionally, the processor circuit 250 may cycle the electric power provided by the controller 200 to that device via a corresponding one of the power conductors 116-119. Following this cycling of power, the processor circuit 250 may signal the corresponding one of the device drivers 146-149 through the controller driver 145 to indicate that the electric power for that device has been cycled. Alternatively, following this cycling of power, the processor circuit 250 may simply allow the processor circuit 150 to be caused to detect that the device is no longer in an inoperative state. In response, with that device now in a known initial state following restoration of power, the processor circuit 150 is further caused to configure that device to once again be put to use.

Thus, as depicted in and as just discussed in reference to FIG. 2, in various possible embodiments, the actions of the processor circuits 150 and 250 may be coordinated through the controller driver 145 (if present), and one or both of the processor circuits 150 and 250 may be caused to recurringly read the registers 136-139 to detect an inoperative state of any of the corresponding ones of these devices.

FIG. 3 illustrates a block diagram of a variation of the computing device 1000 as presented in FIG. 2. This variation depicted in FIG. 3 is similar to what is depicted in FIG. 2 in many ways, and thus, like reference numerals are used to refer to like elements throughout. However, unlike the variant of the computing device 1000 of FIG. 2, in the variant of the computing device 1000 of FIG. 3, the controller 200 is additionally coupled to each of the devices 165c, 195a, 185 and 195b via signal conductors 236, 237, 238 and 239, respectively. Thus, the controller 200 is able to exchange signals with each of these devices in a manner that does not involve use of the coupling 155. It may be that each of the conductors 236-239 conduct a relatively simple recurring signal (e.g., clock pulses) provided by each of these devices to the controller 200 while each of these devices remains in an operative state. Thus, the cessation of such a regularly timed signals from one of these devices may indicate its entry into an inoperative state. Alternatively, it may be that the conductors 236-239 comprise one or more buses, e.g., either a single common bus comprising conductors that extend to all of these devices, or separate point-to-point buses that each comprise one or more conductors that extend separately from the controller 200 to each of these devices as depicted. Where the conductors 236-239 comprise one or more buses, the controller may perform bus operations (e.g., reading the registers 136-139) to monitor these devices for entry into an inoperative state.

Therefore, in some embodiments, the processor circuit 250 may be caused by execution of the control routine 240 to recurringly employ the conductors 236-239 to monitor corresponding ones of the devices 165c, 185 and 195a-b for indications of having entered an inoperative state. Again, this may be done by the processor circuit 250 monitoring each of the conductors 236-239 for the presence of expected signals from corresponding ones of these devices (possibly recurring signals such as clock pulses at a regular interval), or this may be done by the processor circuit 250 operating each of the conductors 236-239 on a recurring basis to engage in bus operations by which each of these devices is caused each time to respond in a manner indicative of continuing to be in an operative state. Upon detecting via one of the conductors 236-239 that a corresponding one of these devices has become inoperative, the processor circuit 250 may be caused, initially, to signal a corresponding one of the device drivers 146-149 (via the controller driver 145) to attempt to correct the inoperative state, possibly through causing the processor circuit 150 to access a portion of the inoperative device associated with initiating a reset of that inoperative device. Alternatively or additionally, the processor circuit 250 may be caused to cycle the electric power provided by the controller 200 to that device via a corresponding one of the power conductors 116-119. As the processor circuit 250 does so, it maintains the provision of electric power to others of the devices 165*c*, 185 and 195*a-b* via others of the conductors 116-119 without interruption. Following this cycling of power, the processor circuit 250 may signal the corresponding one of the device drivers 146-149 through the controller driver 145 to indicate that the electric power for that device has been cycled. Alternatively, following this cycling of power, the processor circuit 250 may simply allow the processor circuit 150 to be caused to independently detect that the device is no longer in an inoperative state. In response, with that device now in a known initial state following restoration of power, further execution of that corresponding device driver causes the processor circuit 150 to configure that device to once again be put to use.

As previously discussed, one or more of the components 165*c*, 185 and 195*a-b* may require the cycling of their electric power to be performed in a staged manner in the provision and/or cessation of provision of electric power must be carried out in a sequenced or staged manner. While this discussion centered on the use of a multitude of power conductors (specifically, the example of conductors 118*a-c* conveying electric power to the display interface 185 in FIG. 1) to enable electric power to different portions of a component to be removed and/or restored in a particular order, it may alternatively or additionally be that such staging of the provision or removal of electric power may be at least partially performed through use of one or more registers within that component. Specifically, and by way of example, FIG. 3 depicts the display interface 185 as comprising an additional register 135 that may be accessed to control at least some of the staging of the provision and/or removal of power. More specifically, and where the computing device 1000 incorporates the display 180 such that the computing device 1000 provides electric power to the display 180, it may be that power for the backlighting and/or visual presentation of pixels on the display 180 may be provided through the display interface 185, and that the removal of electric power from the display interface 185 necessarily requires that electric power to the display 180 be removed, first. Thus, in this example, where the controller 200 acts to cease providing electric power to the display interface 185, the controller 200 may first access the register 135 (via the coupling 155 and/or via the signal conductor(s) 238) to cause the display interface 185 to first cease providing electric power to the backlighting and logic within the display 180 for visually presenting pixels of an image. Then, the controller 200 acts to remove the provision of electric power to the display interface 185, itself, possibly via multiple conductors 118*a-c* (see FIG. 1) to possibly remove electric power from input/output drivers of the display interface 185 before removing electric power from core digital logic within the display interface 185. The controller 200 may then reverse this staging in restoring the provision of electric power, first providing electric power to digital logic within the core of the display interface 185, then providing electric power to the input/output drivers of the display interface 185, and then accessing the register 135 to provide power onward through the display interface 185 to the display 180.

FIG. 4 illustrates a block diagram of a variation of the computing device 1000 as presented in FIG. 3. This variation depicted in FIG. 4 is similar to what is depicted in FIG. 3 in many ways, and thus, like reference numerals are used to refer to like elements throughout. However, unlike the variant of the computing device 1000 of FIG. 3, in the variant of the computing device 1000 of FIG. 4, the registers 136-139 are not present in the devices 165*c*, 185 and 195*a-b*. Thus, monitoring for indications of an inoperative state is performed by the controller 200 exchanging signals with each of these devices via the conductors 236-239.

Therefore, in some embodiments, the processor circuit 250 may be caused by execution of the control routine 240 to recurringly employ the conductors 236-239 to monitor corresponding ones of the devices 165*c*, 185 and 195*a-b* for indications of having entered an inoperative state. Upon detecting via one of the conductors 236-239 that a corresponding one of these devices has become inoperative, the processor circuit 250 may be caused, initially, to signal a corresponding one of the device drivers 146-149 (via the controller driver 145) to attempt to correct the inoperative state, possibly through causing the processor circuit 150 to access a portion of the inoperative device associated with initiating a reset of that inoperative device. Alternatively or additionally, the processor circuit 250 may be caused to cycle the electric power provided by the controller 200 to that device via a corresponding one of the power conductors 116-119. Following this cycling of power, the processor circuit 250 may signal the corresponding one of the device drivers 146-149 through the controller driver 145 to indicate that the electric power for that device has been cycled. In response, with that device now in a known initial state following restoration of power, further execution of that corresponding device driver causes the processor circuit 150 to configure that device to once again be put to use.

Figure 5:
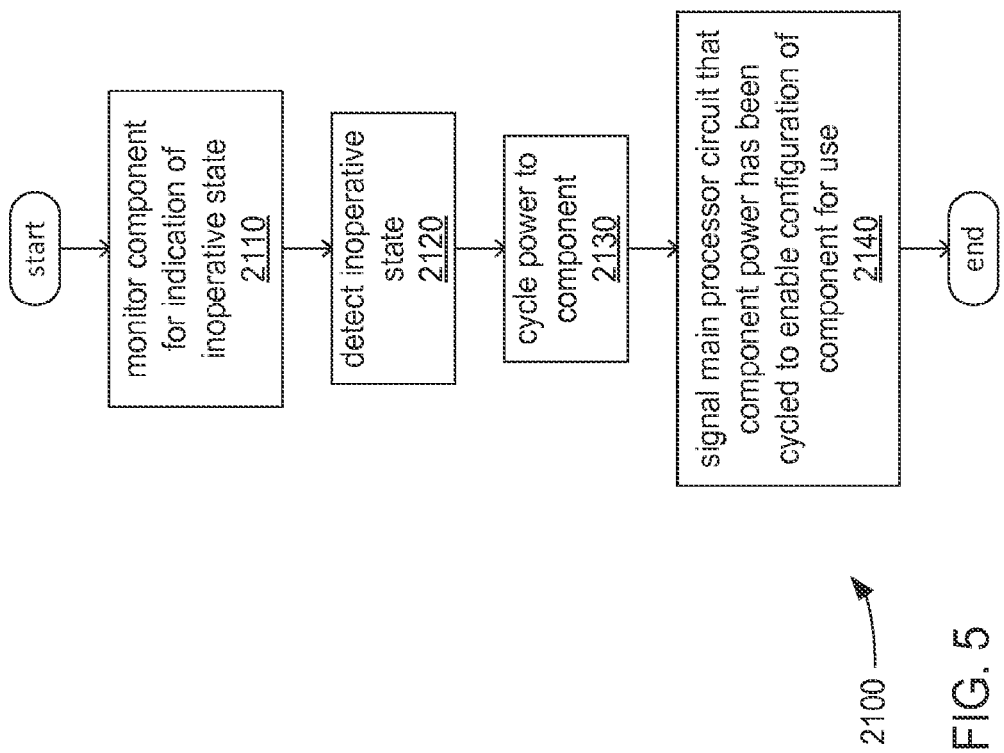
FIG. 5 illustrates an embodiment of a first logic flow.

FIG. 5 illustrates an embodiment of a logic flow 2100. The logic flow 2100 may be representative of some or all of the operations executed by one or more embodiments described herein. More specifically, the logic flow 2100 may illustrate operations performed by at least the processor circuit 250 of the computing device 1000 in executing at least the boot routine 240.

At 2110, a controller of a computing device (e.g., the controller 200 of the computing device 1000) monitors a component for an indication of the component becoming inoperative. As previously discussed, a controller may receive signals from a component, such as a clocked signal, a signal conveying the values of one or more bits read from a register of a component, etc.

At 2120, the controller detects that the component has entered an inoperative state. As previously discussed, the controller may cease receiving a signal at an expected interval, or the controller may receive a signal conveying a value of a bit that is not what was expected.

At 2130, the controller cycles a supply of electric power to the component. As previously discussed, it is the provision of electric power to the component detected as having become inoperative that is cycled, while electric power provided to other components is allowed to continue without interruption.

At 2140, the controller signals the main processor circuit of the computing device (e.g., the processor circuit 150 of the computing device 1000) that the electric power to the component has been cycled, thereby enabling the main processor circuit to configure the component for use. As has been discussed, a processor circuit of a computing device may execute a device driver associated with the component, and upon receipt of an indication that electric power to the component has been cycled (and thus, placed in a known initial state), the processor circuit may be caused to configure the component for use.

Figure 6:
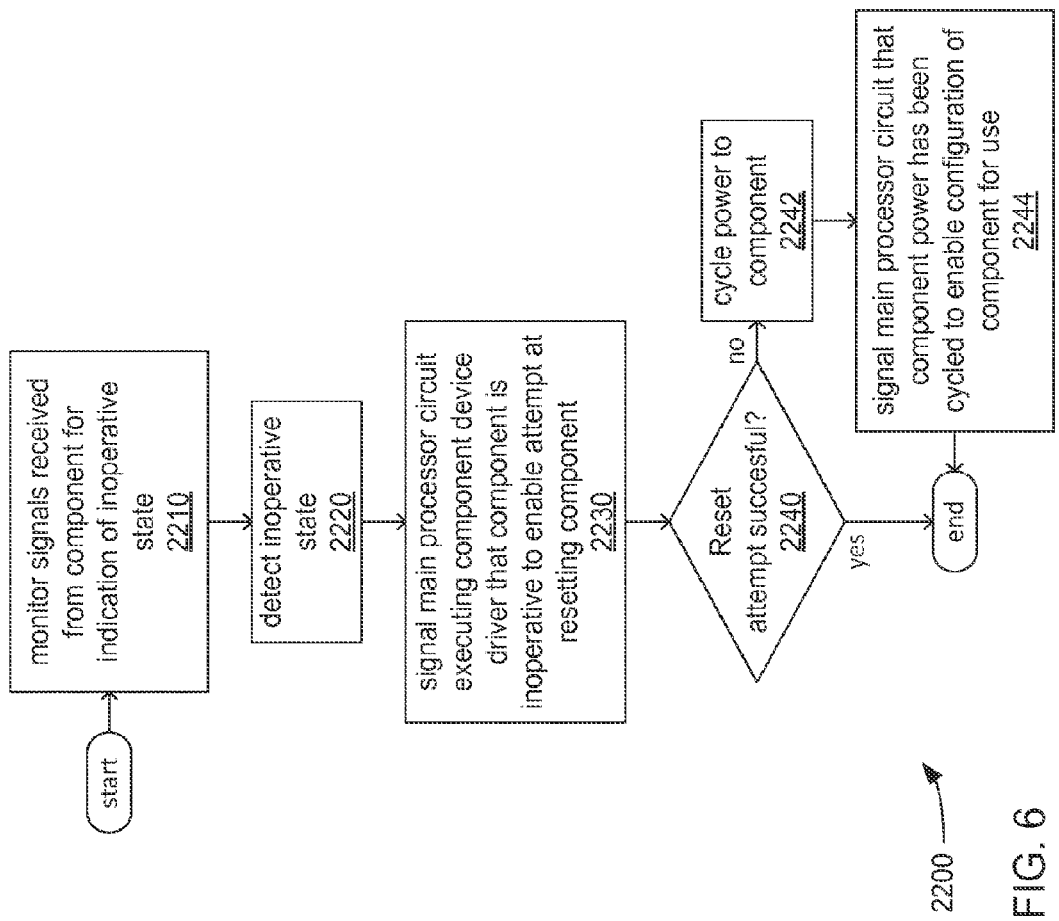
FIG. 6 illustrates an embodiment of a second logic flow.

FIG. 6 illustrates an embodiment of a logic flow 2200. The logic flow 2200 may be representative of some or all of the operations executed by one or more embodiments described herein. More specifically, the logic flow 2200 may illustrate operations performed by at least the processor circuit 250 of the computing device 1000 in executing at least the boot routine 240.

At 2210, a controller of a computing device (e.g., the controller 200 of the computing device 1000) monitors signals received from a component for an indication of the component becoming inoperative.

At 2220, the controller detects that the component has entered an inoperative state. Again, the indication of the component becoming inoperative may be a lack of receipt of an expected signal.

At 2230, the controller signals the main processor circuit of the computing device (e.g., the processor circuit 150 of the computing device 1000) that the component is inoperative, thereby enabling the main processor circuit (in executing a device driver associated with the component) to attempt to reset the component.

If, at 2240, the attempt at resetting the component was not successful, then the controller cycles the electric power provided to the component at 2242 (while maintaining the provision of electric power to other components without interruption). Also, the controller signals the main processor circuit that the electric power for the component has been cycled to enable the main processor circuit (in executing the device drive associated with the component) to configure the component for use at 2244.

Figure 7:
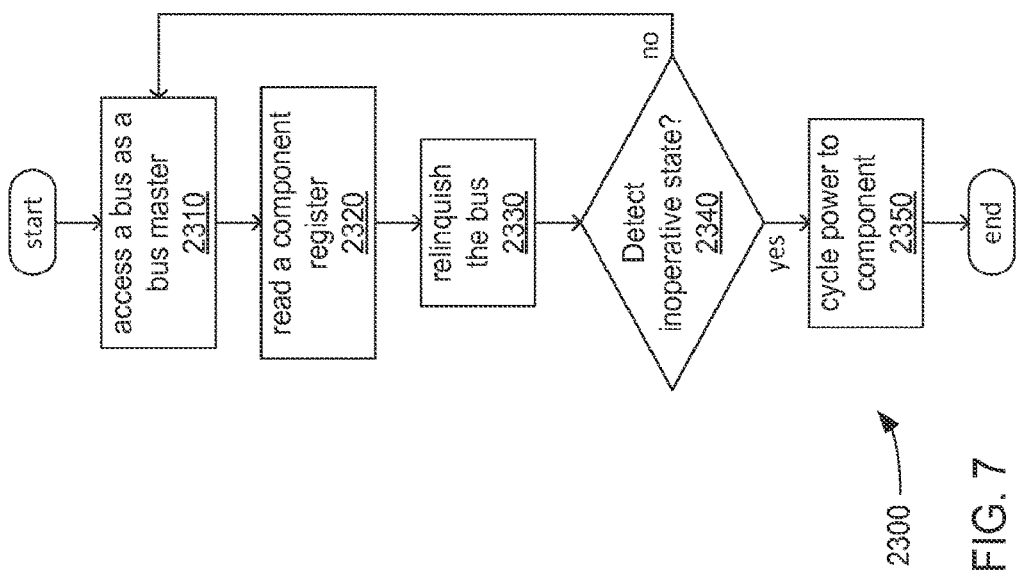
FIG. 7 illustrates an embodiment of a third logic flow.

FIG. 7 illustrates an embodiment of a logic flow 2300. The logic flow 2300 may be representative of some or all of the operations executed by one or more embodiments described herein. More specifically, the logic flow 2300 may illustrate operations performed by at least the processor circuit 250 of the computing device 1000 in executing at least the boot routine 240.

At 2310, a controller of a computing device (e.g., the controller 200 of the computing device 1000) accesses a bus and/or a portion of another form of coupling of the computing device (e.g., a portion of the coupling 155) as a bus master.

At 2320, the controller reads a register of a component. As previously discussed, the register comprises one or more bits that are expected to have particular binary value(s) when read and/or within a specific amount of time after being read.

At 2330, the controller relinquishes that bus or portion of another form of coupling.

If, at 2340, the controller detects an indication of the component becoming inoperative based on what the controller read from that register, then the controller cycles a supply of electric power to the component at 2350. Otherwise, the controller again accesses the bus or portion of another form of coupling at 2310 in preparation for reading the register again at 2320.

Figure 8:
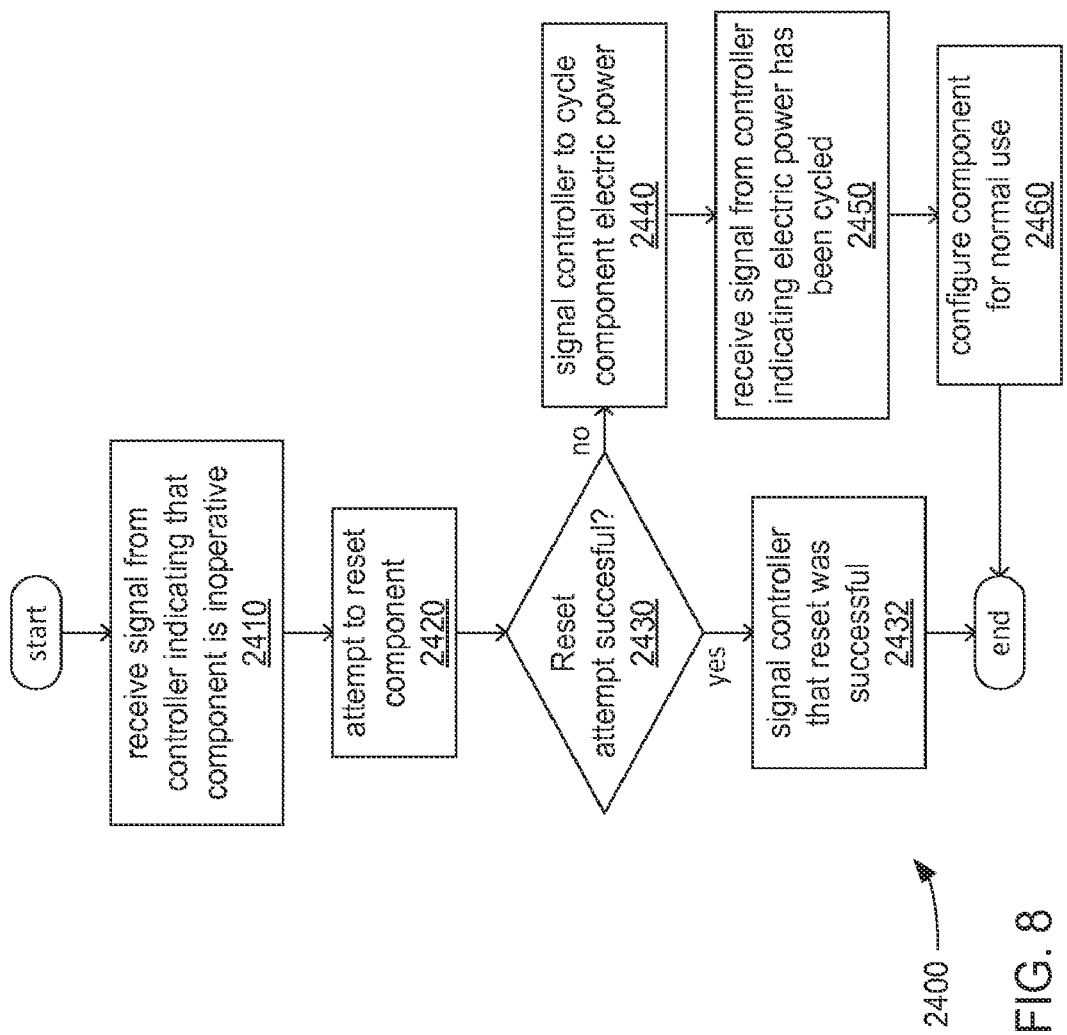
FIG. 8 illustrates an embodiment of a fourth logic flow.

FIG. 8 illustrates an embodiment of a logic flow 2400. The logic flow 2400 may be representative of some or all of the operations executed by one or more embodiments described herein. More specifically, the logic flow 2400 may illustrate operations performed by at least the processor circuit 150 of the computing device 1000 in executing at least the boot routines 140.

At 2410, a main processor circuit of a computing device (e.g., the processor circuit 150 of the computing device 1000) receives a signal from a controller of the computing device that a component of the computing device is inoperative.

At 2420, the main processor circuit attempts to reset the component. As previously discussed, the main processor circuit may attempt to access a register of the component that is associated within effecting a reset.

If, at 2430, the attempt at resetting the component was successful, then the main processor circuit signals the controller that the reset was successful at 2432.

Otherwise, if the attempt at resetting was not successful, then the main processor circuit signals the controller to cycle the electric power provided to the component at 2440. Also, the main processor circuit receives a signal from the controller that the electric power for the component has been cycled at 2450, and the main processor circuit configures the component for use at 2460.

Figure 9:
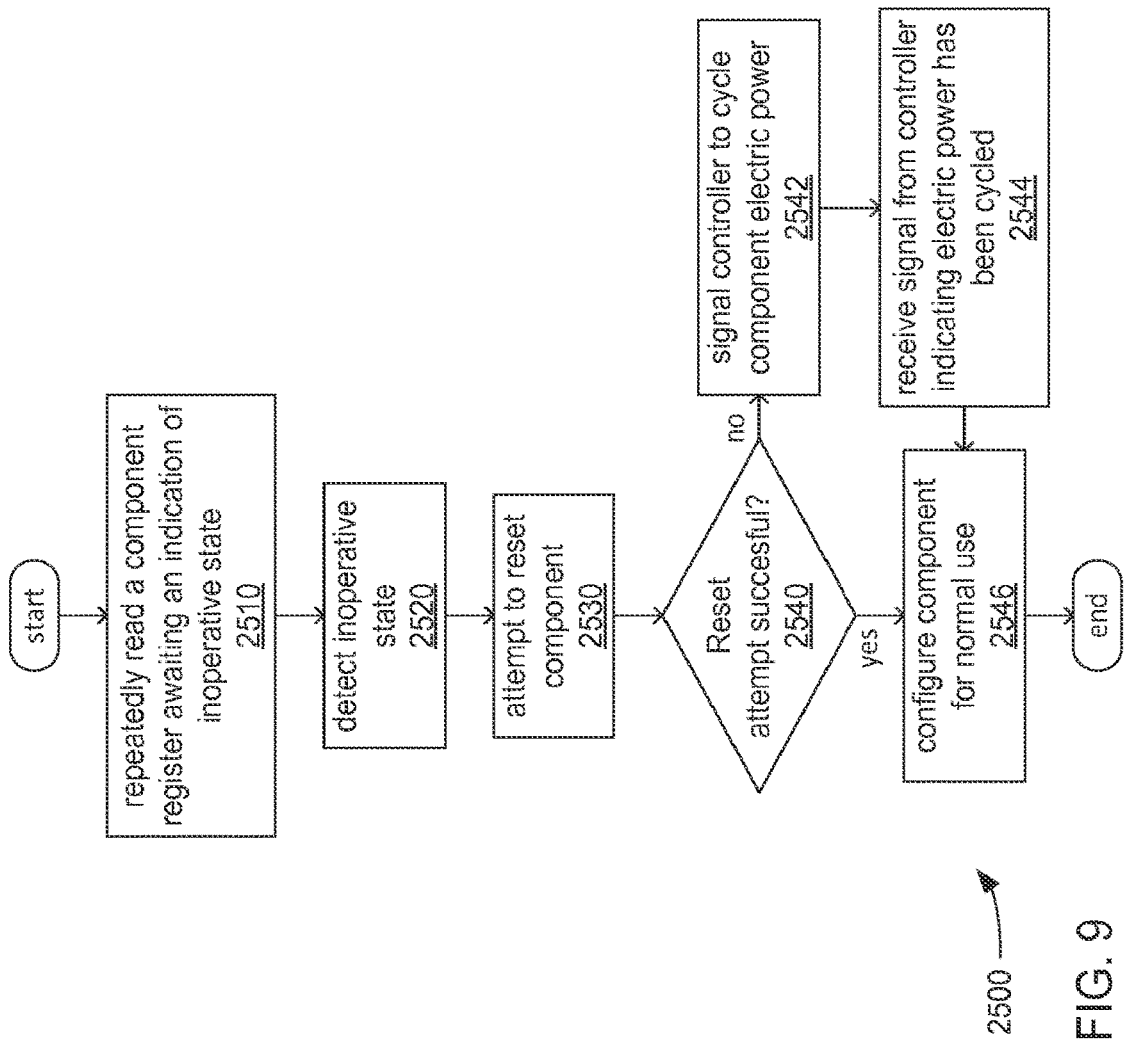
FIG. 9 illustrates an embodiment of a fifth logic flow.

FIG. 9 illustrates an embodiment of a logic flow 2500. The logic flow 2500 may be representative of some or all of the operations executed by one or more embodiments described herein. More specifically, the logic flow 2500 may illustrate operations performed by at least the processor circuit 150 of the computing device 1000 in executing at least the boot routines 140.

At 2510, a main processor circuit of a computing device (e.g., the processor circuit 150 of the computing device 1000) repeatedly reads a register of a component awaiting an indication of the component entering an inoperative state.

At 2520, the main processor circuit detects that the component is inoperative as a result of a reading of the register.

At 2530, the main processor circuit attempts to reset the component.

If, at 2540, the attempt at resetting the component was successful, then the main processor circuit configures the component for use at 2546.

Otherwise, if the attempt at resetting was not successful, then the main processor circuit signals a controller of the computing device (e.g., the controller 200 of the computing device 1000) to cycle the electric power provided to the component at 2542. Also, the main processor circuit receives a signal from the controller that the electric power for the component has been cycled at 2544, and the main processor circuit configures the component for use at 2546.

Figure 10:
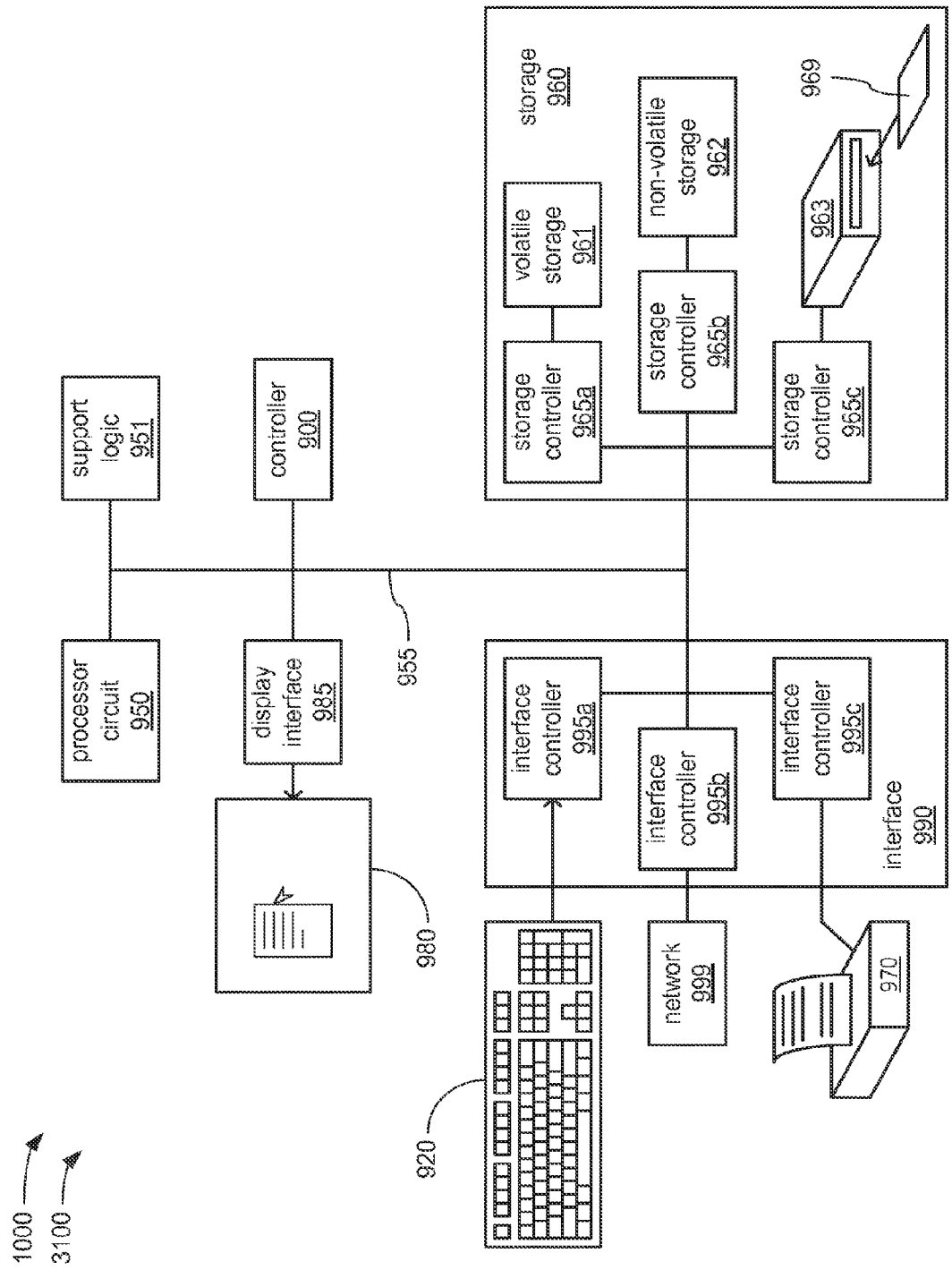
FIG. 10 illustrates an embodiment of a processing architecture.

FIG. 10 illustrates an embodiment of an exemplary processing architecture 3100 suitable for implementing various embodiments as previously described. More specifically, the processing architecture 3100 (or variants thereof) may be implemented as part of one or more of the computing devices 1000 and 400, and/or within the controller 200. It should be noted that components of the processing architecture 3100 are given reference numbers in which the last two digits correspond to the last two digits of reference numbers of components earlier depicted and described as part of each of the computing device 1000 and the controller 200. This is done as an aid to correlating such components of whichever ones of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3100, a computing device comprises at least a processor circuit 950, a storage 960, a controller 900, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

The controller 900 corresponds to the controller 200. As previously discussed, the controller 200 may implement the processing architecture 3100. Thus, in essence, the controller 200 could be regarded, at least to some extent, as a computing device embedded within the computing device 1000. As such, the controller 200 may perform various functions, including those that have been described at length herein, in support of the computing device 1000 performing various functions.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150 and 250) may comprise any of a wide variety of commercially available processors, employing any of a wide variety of technologies and implemented with one or more cores physically combined in any of a number of ways.

As previously discussed, the storage 960 (corresponding to one or more of the storages 160 and 260) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage medium 969 (possibly corresponding to the storage medium 169), the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920 (possibly corresponding to the controls 120). The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to the display 180), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a controller processor circuit; a first component comprising digital logic and provided with electric power controlled by the controller processor circuit, a second component comprising digital logic and provided with electric power controlled by the controller processor circuit, and a controller storage communicatively coupled to the controller processor circuit and arranged to store instructions. The instructions are operative on the controller processor circuit to receive a signal that indicates that the first component is inoperative, and cycle the electric power to the first component while continuing to provide electric power to the second component based on the signal.

The above example of an apparatus in which the controller processor circuit is coupled to the first and second components, and the instructions are operative on the controller processor circuit to recurringly monitor signals received from the first and second components for an indication that either the first component or the second component is inoperative.

Either of the above examples of an apparatus in which the signal that indicates that the first component is inoperative is received from the first component and comprises an indication of a value of a bit of a register of the first component.

Any of the above examples of an apparatus in which the controller processor circuit is coupled to the first component via a bus; and the instructions are operative on the controller processor circuit to assume the role of a bus master on the bus, and read a register of the first component, the signal that indicates that the first component is inoperative is received via reading the register and comprises an indication of a value of a bit of the register.

Any of the above examples of an apparatus in which the apparatus comprises a main processor circuit, and the instructions are operative on the controller processor circuit to receive the signal that indicates that the first component is inoperative from the main processor circuit.

Any of the above examples of an apparatus in which the apparatus comprises first and second power conductors that provide electric power to the first component; and the instructions are operative on the controller processor circuit to cause cessation of the provision of electric power to the first component via the first power conductor, cause cessation of the provision of electric power to the first component via the second power conductor after cessation of the provision of electric power via the first power conductor, cause provision of electric power to the first component via the second power conductor to resume after cessation of the provision of electric power via both the first and second power conductors, and cause provision of electric power to the first component via the first power conductor to resume after resumption of the provision of electric power via the second power conductor.

Any of the above examples of an apparatus in which the instructions are operative on the controller processor circuit to access a register of the first component to cause the first component to cease to provide electric power provided to the first component to a device before cycling of the electric power provided to the first component, and access the register of the first component to cause the first component to resume provision of electric power provided to the first component to the device after cycling of the electric power provided to the first component.

Any of the above examples of an apparatus in which the apparatus comprises a main processor circuit; and the instructions are operative on the controller processor circuit to provide an indication to the main processor circuit that the first component is inoperative, and receive an indication from the main processor circuit that an attempt by the main processor circuit to reset the first component did not succeed.

Any of the above examples of an apparatus in which the apparatus comprises a main processor circuit; and the instructions are operative on the controller processor circuit to provide an indication to the main processor circuit that the electric power provided to the first component has been cycled.

An example of another apparatus comprises a main processor circuit; a controller; a first component comprising digital logic and provided with electric power controlled by the controller; a second component comprising digital logic and provided with electric power controlled by the controller; and a main storage communicatively coupled to the main processor circuit and arranged to store instructions. The instructions are operative on the main processor circuit to receive an indication that the first component is inoperative; and transmit a signal to the controller to cycle the electric power provided to the first component while continuing to provide electric power to the second component based on the indication.

The above example of another apparatus in which the main processor circuit is coupled to the first and second components, and the instructions are operative on the main processor circuit to recurringly monitor signals received from the first and second components for indications that either the first component or the second component is inoperative.

Either of the above examples of another apparatus in which the indication that the first component is inoperative comprises an indication of a value of a bit of a register of the first component.

Any of the above examples of another apparatus in which the indication that the first component is inoperative received from the controller.

Any of the above examples of another apparatus in which the instructions are operative on the main processor circuit to attempt to reset the first component by accessing a register of the first component.

Any of the above examples of another apparatus in which the instructions are operative on the main processor circuit to transmit the signal to cycle the electric power provided to the first component in response to failure of the attempt to reset the first component.

Any of the above examples of another apparatus in which the instructions are operative on the main processor circuit to receive an indication from the controller that the electric power provided to the first component has been cycled, and configure the first component for use in response to receipt of the indication that the electric power provided to the first component has been cycled.

An example of a computer-implemented method comprises receiving a signal indicating that a first component of a computing device is inoperative, and cycling electric power provided to the first component while continuing to provide electric power to a second component of the computing device.

The above example of a computer-implemented method in which the method comprises recurringly monitoring signals received from the first and second components for an indication that either the first component or the second component is inoperative.

Either of the above examples of a computer-implemented method in which the signal that indicates that the first component is inoperative is received from the first component and comprises an indication of a value of a bit of a register of the first component.

Any of the above examples of a computer-implemented method in which the method comprises receiving the signal that indicates that the first component is inoperative from a main processor circuit of the computing device.

Any of the above examples of a computer-implemented method in which the method comprises cycling the electric power provided to the first component by ceasing provision of electric power to the first component via a first power conductor; ceasing provision of electric power to the first component via a second power conductor after cessation of the provision of electric power via the first power conductor; resuming provision of electric power to the first component via the second power conductor after cessation of the provision of electric power via both the first and second power conductors; and resuming provision of electric power to the first component via the first power conductor after resumption of the provision of electric power via the second power conductor.

Any of the above examples of a computer-implemented method in which the method comprises accessing a register of the first component to cause the first component to cease to provide electric power provided to the first component to a device before cycling of the electric power provided to the first component; and accessing the register of the first component to cause the first component to resume provision of electric power provided to the first component to the device after cycling of the electric power provided to the first component.

Any of the above examples of a computer-implemented method in which the method comprises providing an indication to a main processor circuit of the computing device that the first component is inoperative; and receiving an indication from the main processor circuit that an attempt by the main processor circuit to reset the first component did not succeed.

Any of the above examples of a computer-implemented method in which the method comprises providing an indication to a main processor circuit of the computing device that the electric power provided to the first component has been cycled.

An example of at least one machine-readable storage medium comprising instructions that when executed by a computing device, causes the computing device to receive a signal indicating that a first component of the computing device is inoperative, and cycle electric power provided to the first component while continuing to provide electric power to a second component of the computing device.

The above example of at least one machine-readable storage medium in which the computing device is caused to recurringly monitor signals received from the first and second components for an indication that either the first component or the second component is inoperative.

Either of the above examples of at least one machine-readable storage medium in which the signal that indicates that the first component is inoperative is received from the first component and comprises an indication of a value of a bit of a register of the first component.

Any of the above examples of at least one machine-readable storage medium in which the computing device is caused to receive the signal that indicates that the first component is inoperative from a main processor circuit of the computing device.

Any of the above examples of at least one machine-readable storage medium in which the computing device is caused to provide an indication to a main processor circuit of the computing device that the first component is inoperative, and receive an indication from the main processor circuit that an attempt by the main processor circuit to reset the first component did not succeed.

Any of the above examples of at least one machine-readable storage medium in which the computing device is caused to provide an indication to a main processor circuit of the computing device that the electric power provided to the first component has been cycled.

An example of still another apparatus comprises a controller comprising logic causing the controller to be operative to receive a signal that indicates that a first component is inoperative, the first component comprising digital logic and provided with electric power controlled by the controller through at least a first power switching device; and cycle the electric power to the first component while continuing to provide electric power to a second component based on the signal, the second component comprising digital logic and provided with electric power controlled by the controller through at least a second power switching device.

The above example of still another apparatus in which the controller is coupled to the first and second components, and the controller is operative to recurringly monitor signals received from the first and second components for an indication that either the first component or the second component is inoperative.

Either of the above examples of still another apparatus in which the controller is coupled to the first component via a bus; and is operative to assume the role of a bus master on the bus, and read a register of the first component, the signal that indicates that the first component is inoperative is received via reading the register and comprises an indication of a value of a bit of the register.

Any of the above examples of still another apparatus in which the apparatus comprises a main processor circuit, the controller operative to receive the signal that indicates that the first component is inoperative from the main processor circuit.

Any of the above examples of still another apparatus in which the at least a first power switching device comprises a first switching device operative to provide electric power to the first component via a first power conductor and a second switching device operative to provide electric power to the first component via a second power conductor; and the controller is operative to operate the first power switching device to cease provision of electric power to the first component via the first power conductor, operate the second power switching device to cease provision of electric power to the first component via the second power conductor after cessation of the provision of electric power via the first power conductor, operate the second power switching device to resume provision of electric power to the first component via the second power conductor after cessation of the provision of electric power via both the first and second power conductors, and operate the first power switching device to resume provision of electric power to the first component via the first power conductor after resumption of the provision of electric power via the second power conductor.

Any of the above examples of still another apparatus in which the controller comprises the at least a first power switching device and the at least a second power switching device.

What is claimed is:

1. An apparatus comprising:
   a controller processor circuit;
   a first component comprising digital logic and provided with electric power controlled by the controller processor circuit;
   a second component comprising digital logic and provided with electric power controlled by the controller processor circuit; and
   a controller storage communicatively coupled to the controller processor circuit and arranged to store instructions operative on the controller processor circuit to:
   assume a role of bus master on a bus;
   receive a signal from a main processor circuit that indicates that the first component is inoperative; and
   cycle the electric power to the first component while continuing to provide electric power to the second component based on the signal.

2. The apparatus of claim 1, the controller processor circuit coupled to the first and second components, and the instructions operative on the controller processor circuit to recurringly monitor signals received from the first and second components for an indication that either the first component or the second component is inoperative.

3. The apparatus of claim 1, the controller processor circuit coupled to the first component via the bus, and the instructions operative on the controller processor circuit to:
   read a register of the first component, the signal that indicates that the first component is inoperative is received via reading the register and comprises an indication of a value of a bit of the register.

4. The apparatus of claim 1, comprising first and second power conductors that provide electric power to the first component, and the instructions operative on the controller processor circuit to:
   cause cessation of the provision of electric power to the first component via the first power conductor;
   cause cessation of the provision of electric power to the first component via the second power conductor after cessation of the provision of electric power via the first power conductor;
   cause provision of electric power to the first component via the second power conductor to resume after cessation of the provision of electric power via both the first and second power conductors; and
   cause provision of electric power to the first component via the first power conductor to resume after resumption of the provision of electric power via the second power conductor.

5. The apparatus of claim 1, comprising a main processor circuit, the instructions operative on the controller processor circuit to provide an indication to the main processor circuit that the electric power provided to the first component has been cycled.

6. An apparatus comprising:
   a main processor circuit;
   a controller;
   a main storage communicatively coupled to the main processor circuit and arranged to store instructions operative on the main processor circuit to:
   assume a role of bus master on a bus;
   receive from the controller an indication that a first component is inoperative, the first component comprising digital logic and provided with electric power controlled by the controller; and
   transmit a signal to the controller to cycle the electric power provided to the first component while continuing to provide electric power to a second component based on the indication, the second component comprising digital logic and provided with electric power controlled by the controller.

7. The apparatus of claim 6, the main processor circuit coupled to the first and second components, and the instructions operative on the main processor circuit to recurringly monitor signals received from the first and second components for indications that either the first component or the second component is inoperative.

8. The apparatus of claim 7, the indication that the first component is inoperative comprises an indication of a value of a bit of a register of the first component.

9. The apparatus of claim 6, the instructions operative on the main processor circuit to attempt to reset the first component by accessing a register of the first component.

10. The apparatus of claim 9, the instructions operative on the main processor circuit to transmit the signal to cycle the electric power provided to the first component in response to failure of the attempt to reset the first component.

11. The apparatus of claim 6, the instructions operative on the main processor circuit to:
   receive an indication from the controller that the electric power provided to the first component has been cycled; and
   configure the first component for use in response to receipt of the indication that the electric power provided to the first component has been cycled.

12. A computer-implemented method comprising:
assuming a role of bus master on a bus;
receiving by a main processor circuit a signal from a controller indicating that a first component of a computing device is inoperative; and
cycling electric power provided to the first component while continuing to provide electric power to a second component of the computing device.

13. The computer-implemented method of claim 12, comprising recurringly monitoring signals received from the first and second components for an indication that either the first component or the second component is inoperative.

14. The computer-implemented method of claim 13, the signal that indicates that the first component is inoperative is initially received from the first component and comprises an indication of a value of a bit of a register of the first component.

15. The computer-implemented method of claim 12, comprising cycling the electric power provided to the first component by:
ceasing provision of electric power to the first component via a first power conductor;
ceasing provision of electric power to the first component via a second power conductor after cessation of the provision of electric power via the first power conductor;
resuming provision of electric power to the first component via the second power conductor after cessation of the provision of electric power via both the first and second power conductors; and
resuming provision of electric power to the first component via the first power conductor after resumption of the provision of electric power via the second power conductor.

16. The computer-implemented method of claim 12, comprising:
receiving an indication from the main processor circuit that an attempt by the main processor circuit to reset the first component did not succeed.

17. An apparatus comprising a controller comprising logic causing the controller to be operative to:
assume a role of bus master on a bus;
receive a signal from a main processor circuit that indicates that a first component is inoperative, the first component comprising digital logic and provided with electric power controlled by the controller through at least a first power switching device; and
cycle the electric power to the first component while continuing to provide electric power to a second component based on the signal, the second component comprising digital logic and provided with electric power controlled by the controller through at least a second power switching device.

18. The apparatus of claim 17, the controller coupled to the first and second components, and the controller operative to recurringly monitor signals received from the first and second components for an indication that either the first component or the second component is inoperative.

19. The apparatus of claim 17, the controller coupled to the first component via the bus, and operative to:
read a register of the first component, the signal that indicates that the first component is inoperative is received via reading the register and comprises an indication of a value of a bit of the register.

20. The apparatus of claim 17, the at least a first power switching device comprising a first switching device operative to provide electric power to the first component via a first power conductor and a second switching device operative to provide electric power to the first component via a second power conductor, the controller operative to:
operate the first power switching device to cease provision of electric power to the first component via the first power conductor;
operate the second power switching device to cease provision of electric power to the first component via the second power conductor after cessation of the provision of electric power via the first power conductor;
operate the second power switching device to resume provision of electric power to the first component via the second power conductor after cessation of the provision of electric power via both the first and second power conductors; and
operate the first power switching device to resume provision of electric power to the first component via the first power conductor after resumption of the provision of electric power via the second power conductor.

* * * * *